(12) United States Patent
Suh et al.

(10) Patent No.: US 9,789,471 B2
(45) Date of Patent: Oct. 17, 2017

(54) MONOLITH CATALYST FOR CARBON DIOXIDE REFORMING REACTION, PREPARATION METHOD FOR SAME, AND PREPARATION METHOD FOR SYNTHESIS GAS USING SAME

(71) Applicant: KOREA RESEARCH INSTITUTE OF CHEMICAL TECHNOLOGY, Daejeon (KR)

(72) Inventors: Jeong Kwon Suh, Daejeon (KR); Young Woo You, Gyeonggi-do (KR); Ji Hye Lee, Seoul (KR); Hongchan Ahn, Daejeon (KR); Tae Sun Chang, Daejeon (KR); Beon Sik Kim, Daejeon (KR)

(73) Assignee: KOREA RESEARCH INSTITUTE OF CHEMICAL TECHNOLOGY, Daejeon (KR)

( * ) Notice: Subject to any disclaimer, the term of this patent is extended or adjusted under 35 U.S.C. 154(b) by 0 days.

(21) Appl. No.: 14/878,300

(22) Filed: Oct. 8, 2015

(65) Prior Publication Data

US 2016/0030927 A1    Feb. 4, 2016

Related U.S. Application Data

(63) Continuation of application No. PCT/KR2014/003952, filed on May 2, 2014.

(30) Foreign Application Priority Data

May 8, 2013 (KR) .................. 10-2013-0052116

(51) Int. Cl.
*B01J 23/00* (2006.01)
*B01J 23/755* (2006.01)
(Continued)

(52) U.S. Cl.
CPC ............ *B01J 23/755* (2013.01); *B01J 21/04* (2013.01); *B01J 21/08* (2013.01); *B01J 23/75* (2013.01);
(Continued)

(58) Field of Classification Search
CPC ...... B01J 23/755; B01J 35/0006; B01J 37/04; B01J 37/0215; B01J 21/04; B01J 37/0236;
(Continued)

(56) References Cited

U.S. PATENT DOCUMENTS

| 4,026,823 A | 5/1977 | Van Hook et al. |
| 5,068,057 A | 11/1991 | Gustafson et al. |

(Continued)

FOREIGN PATENT DOCUMENTS

| KR | 1019930016885 A | 8/1993 |
| KR | 1019990050013 A | 11/1999 |

(Continued)

OTHER PUBLICATIONS

O. Cherifi, et al; "Microcalorimetric study of the acidity and basicity of $Ni/SiO_2$ catalysts modified by metallic additives Fe, Co, Zr and Ce", Thermochimica Acta 306, pp. 131-134, Nov. 1997.
(Continued)

*Primary Examiner* — Haytham Soliman
(74) *Attorney, Agent, or Firm* — Ladas & Parry LLP; Loren K. Thompson (57) ABSTRACT

The present invention relates to a monolith catalyst for a carbon dioxide reforming reaction and to a preparation method for same, and more specifically the invention provides a preparation method for a monolith catalyst for a methane reforming reaction using carbon dioxide, the method comprising a step of mixing and impregnating a support in a metal precursor solution, coating a monolith
(Continued)

substrate with the solution resulting from the mixing and impregnating, drying same and then calcining the monolith substrate coated with the solution resulting from the mixing and impregnating.

2 Claims, 3 Drawing Sheets (51) Int. Cl.

| | | |
|---|---|---|
| B01J 35/04 | (2006.01) | |
| B01J 21/04 | (2006.01) | |
| B01J 21/08 | (2006.01) | |
| B01J 23/75 | (2006.01) | |
| B01J 35/00 | (2006.01) | |
| B01J 37/02 | (2006.01) | |
| B01J 37/04 | (2006.01) | |
| B01J 37/08 | (2006.01) | |
| C01B 3/40 | (2006.01) | |

(52) U.S. Cl.
CPC ........... *B01J 35/0006* (2013.01); *B01J 35/04* (2013.01); *B01J 37/0215* (2013.01); *B01J 37/0236* (2013.01); *B01J 37/04* (2013.01); *B01J 37/088* (2013.01); *C01B 3/40* (2013.01); *C01B 2203/0238* (2013.01); *C01B 2203/1023* (2013.01); *C01B 2203/1052* (2013.01); *C01B 2203/1058* (2013.01); *C01B 2203/1082* (2013.01); *C01B 2203/1241* (2013.01); *C01B 2203/1247* (2013.01); *Y02P 20/52* (2015.11)

(58) Field of Classification Search
CPC . B01J 23/75; B01J 37/088; B01J 21/08; B01J 35/04; C01B 3/40; C01B 2203/1082; C01B 2203/1241; C01B 2203/1023; C01B 2203/0238; C01B 2203/105
USPC ....................................................... 502/325
See application file for complete search history.

(56) References Cited

U.S. PATENT DOCUMENTS

| 5,744,419 | A | 4/1998 | Choudhary et al. | |
| 6,409,940 | B1 * | 6/2002 | Gaffney | B01J 23/892 |
| | | | | 252/373 |
| 7,090,826 | B2 | 8/2006 | Jiang et al. | |
| 2003/0012711 | A1 * | 1/2003 | Harkins | B01D 3/009 |
| | | | | 422/600 |

FOREIGN PATENT DOCUMENTS

| KR | 1019990061517 A | 12/1999 |
| KR | 1020040118196 A | 12/2004 |
| KR | 1020080073003 A | 7/2008 |
| KR | 1020090039582 A | 5/2009 |
| WO | 92/11199 A1 | 7/1992 |
| WO | 2004/103555 A1 | 12/2004 |
| WO | 2008/099847 A1 | 8/2008 |

OTHER PUBLICATIONS

S.O. Soloviev, et al; "Carbon dioxide reforming of methane on monolithic Ni/Al$_2$O$_3$-based catalysts", Journal of Natural Gas Chemistry vol. 20, pp. 184-190, Mar. 2011.

Xenophon E. Verykios; "Catalytic dry reforming of natural gas for the production of chemicals and hydrogen", International Journal of Hydrogen Energy vol. 28, Issue 10, pp. 1045-1063; Oct. 2003.

Osamu Yamazaki, et al; "Reduction of Carbon Dioxide by Methane with Ni-on-MgO—CaO Containing Catalysts", Chemistry Letters, pp. 1953-1954; vol. 10, Oct. 1992.

Zhaolong Zhang, et al; "Mechanistic aspects of carbon dioxide reforming of methane to synthesis gas over Ni catalysts", Catalysis Letters, vol. 38, Issue 3, pp. 175-179, Sep. 1996.

International Search Report mailed Jul. 29, 2014; PCT/KR2014/003952.

* cited by examiner

MONOLITH CATALYST FOR CARBON DIOXIDE REFORMING REACTION, PREPARATION METHOD FOR SAME, AND PREPARATION METHOD FOR SYNTHESIS GAS USING SAME

TECHNICAL FIELD

The present disclosure relates to a monolith catalyst for a carbon dioxide reforming reaction, a preparation method for same, and a preparation method for a synthesis gas using same.

BACKGROUND ART

As a result of global warming, greenhouse gas reduction plans are reported in all the countries of the world, and South Korea government determined the reduction target of greenhouse gas to 30% relative to the observation value of emission in 2020, thereby increasing the burden in industry. Particularly, damages to steel industry, automobile industry, petrochemical industry, etc., which are energy-guzzling industries and leading export industries seem inevitable. However, the energy efficiency level of domestic companies is already the best in the world, and the capacity available for further reduction of greenhouse gas has limitation. If the reduction is conducted by government regulation, the companies may relocate their plants abroad or may experience delay in production.

As an alternative, the focus of the present invention is not the reduction of the emission amount of carbon dioxide, but the recycling for using emitting carbon dioxide. One of various methods for recycling carbon dioxide is preparation of a synthesis gas through reforming methane using carbon dioxide. The reforming method of methane using carbon dioxide has the merits of removing carbon dioxide and methane, which cause global warming at the same time and preparing a synthesis gas including relatively high content of carbon monoxide ($H_2$:CO=1:1) when compared to other reforming methods. Therefore, the synthesis gas thus prepared may be used as a reactant in a producing process of chemical products with high value such as oxoalcohol, dimethyl ether (DME), polycarbonate (PC), and acetic acid.

A carbon dioxide reforming reaction of methane may be performed as the following Reaction 1.

$$CH_4 + CO_2 \rightarrow 2CO + 2H_2, \Delta H_{298}^0 = +247.3 \text{ kJ/mol} \qquad [\text{Reaction 1}]$$

The reaction is a strongly endothermic reaction. The conversion ratio of equilibrium that is a theoretically maximum conversion ratio at a certain temperature increases according to the increase of the temperature, and the reaction is carried out at the temperature of 650° C. and more. Commonly, the reaction is carried out at the high temperature of 850° C. According to the reaction, since the carbon to hydrogen ratio of reaction gases is high, carbon may be easily produced thermodynamically, and the development of a catalyst restraining the production of cokes and the deactivation due to sintering is required.

In addition, the realization of an appropriate catalyst shape is also significant. In case of using a powder, the application to a process may be difficult due to extreme pressure drop at more than a certain value of flow rate. A catalyst with a granule or pellet shape also may cause pressure drop at a high flow rate. If heat transfer is not smooth, the local temperature in the catalyst may increase largely, and the catalyst may be damaged. In addition, gradual loss of the catalyst may be generated by the abrasion due to mechanical stress.

To solve the above-described limitations, a monolith substrate with a honeycomb structure may be used. In a monolith catalyst in which empty spaces with a rod shape and a honeycomb structure are connected, heat may be easily transferred via walls, and the temperature of the catalyst may be uniform, and the pressure drop may be small. Thus, the monolith catalyst is an appropriate type for treating reactants with a high flow rate. Due to a dense structure, the monolith catalyst has a large surface area per unit volume and excellent abrasion-resistance. By applying the monolith catalyst in a carbon dioxide reforming reaction, low deposition of carbon due to rapid material transfer, durability reinforcement of the catalyst due to high thermal stability, and process compatibilization due to reaction possibility at a high flow rate, may be realized.

Common catalysts for the reforming reaction of methane using carbon dioxide will be explained. Methods for preparing a catalyst by impregnating a nickel metal in magnesium oxide (MgO) and magnesium oxide-alumina (MgO—$Al_2O_3$) supports are disclosed in a literature to Fujimoto, et al. [Chemistry Letters, Reduction of carbon dioxide by methane with Ni-on-MgO—CaO containing catalysts, (1992), 1953-1954] and Korean Patent No. 1999-0061517.

In literatures to Verykios, et al. [Catalysis Letters, Mechanistic aspects of carbon dioxide reforming of methane to synthesis gas over Ni catalysts, 38 (1996), 157-179] and [International Journal of Hydrogen Energy, Catalytic dry reforming of natural gas for the production of chemicals and hydrogen, 28 (2003), 1045-1063], a nickel metal is carried in a lanthanum oxide ($La_2O_3$) support.

Korean Patent Application No. 1999-0050013 discloses a nickel-based reforming catalyst according to a chemical formula obtained by impregnating a nickel metal together with a co-catalyst including an alkali metal, an alkaline earth metal, etc. in a zirconia support in which $ZrO_2$ is modified with an alkaline earth metal and a metal in IIIB group or lanthanides.

Korean Patent Application No. 1993-0016885 discloses a catalyst obtained by impregnating an alkali metal, an alkaline earth metal co-catalyst and nickel in a silicon-containing support such as zeolite, silica, silicate, and silica-alumina, and Korean Patent Application No. 2008-0073003 discloses a catalyst obtained by impregnating an alkaline metal oxide of calcium and potassium as a co-catalyst in a silica mesopore molecular sieve support.

In such reforming reactions of methane using carbon dioxide, developments on a nickel support catalyst with high performance having strong resistance to carbon deposition at an affordable price as in the reforming reaction of vapor are continuously conducted, however are confronted by limitations due to the short catalyst life of nickel. Meanwhile, studies on noble metal catalysts having higher resistivity on carbon deposition and activity than the nickel-based catalyst, however having high price disadvantages are being actively conducted.

U.S. Pat. No. 5,068,057 discloses Pt/$Al_2O_3$ and Pd/$Al_2O_3$ catalysts, and PCT Patent Publication No. 92/11,199 suggests that an alumina catalyst impregnating a noble metal such as iridium, rhodium and ruthenium has high activity and long life.

PCT Patent Publication Nos. 2004/103555 and 2008/099847 suggest catalysts including copper as an essential element and at least one element selected from nickel, cobalt and platinum and having a spinel structure as a metal oxide.

Even though carbon dioxide deformation, etc. is disclosed, examples are limited to the reforming reaction of methanol and DME vapor.

U.S. Pat. No. 5,744,419 discloses a catalyst in which nickel or cobalt is carried in a support of silica, alumina, zirconia, etc. coated with an alkaline earth metal in advance according to the presence of a noble metal concerning a mixed reforming process of vapor reforming including oxygen reforming reaction and carbon dioxide reforming, and U.S. Pat. No. 4,026,823 discloses a nickel catalyst impregnating zirconia, where cobalt is added to nickel, as a vapor reforming catalyst of hydrocarbon.

As described above, studies on the noble metal catalyst and the decrease of catalyst life and activity due to carbon deposition are being actively conducted. However, the unit cost of the catalyst increases due to the use of expensive noble metals, and the replacement of the common nickel catalyst is impractical. Thus, studies on a monolith substrate maintaining activity thereof for a long time and economically useful are being actively conducted.

According to a literature to Soloviev, et al. [Journal of Natural Gas Chemistry, Carbon dioxide reforming of methane on monolithic Ni/$Al_2O_3$-based catalysts, 20 (2011), 184-190], a Ni/$Al_2O_3$-based catalyst is coated on a ceramic monolith, an alkali metal and rare earth metal are added thereto, and effects thereon is examined.

In U.S. Pat. No. 7,090,826, zirconia monolith coated with cerium oxide is prepared and applied to a partial oxidation process.

In Korean Patent Application No. 2009-0039582, a metal monolith catalyst for nature reforming is electrochemically formed using alumina and MgO and an enhancer of Ce, Ba and Sr. Korean Patent Application No. 2004-0118196 provides a vapor reforming structure catalyst in which a nickel-based catalyst is coated on a metal monolith.

As described above, studies on a monolith catalyst is being actively conducted, however studies on the activity of the monolith catalyst and the catalyst life with respect to a common catalyst are imperfect.

Accordingly, the present invention is completed by preparing a monolith catalyst that may replace a common nickel catalyst with low durability and stability, and by comparing with the common catalyst.

DISCLOSURE OF THE INVENTION

Technical Problem

One object of the present invention is to provide a monolith catalyst for a carbon dioxide reforming reaction, a preparation method for same, and a preparation method for a synthesis gas using same.

Technical Solution

In order to achieve the objects, the present invention provides a monolith catalyst for a carbon dioxide reforming reaction including a support impregnating an active material represented by the following Formula 1 and a monolith substrate.

$$a(X)-b(Zr)/Z \qquad \text{[Formula 1]}$$

In the above Formula 1, X is an active material of Co or Ni, Z is a support of $SiO_2$ or $Al_2O_3$, a and b each represents parts per weight of X and Zr relative to component Z in order, and a is 5.0 to 30.0, and b is 1.0 to 30.0 relative to 100 parts by weight of the support (Z).

The present invention also provides a preparation method for a monolith catalyst for a carbon dioxide reforming reaction including a support impregnating an active material represented by the following Formula 1 and a monolith substrate, including the steps of:

mixing and impregnating a metal precursor solution with a support Z of the following Formula 1 so as to meet the component ratio of the following Formula 1 (step 1);

coating a monolith substrate with the mixed and impregnated solution in step 1 (step 2);

drying the monolith substrate coated with the mixed and impregnated solution in step 2 (step 3); and calcining the dried monolith substrate after being coated with the mixed and impregnated solution in step 3 (step 4).

$$a(X)-b(Zr)/Z \qquad \text{[Formula 1]}$$

In the above Formula 1, X is an active material of Co or Ni, Z is a support of $SiO_2$ or $Al_2O_3$, a and b each represents parts per weight of X and Zr relative to component Z in order, and a is 5.0 to 30.0, and b is 1.0 to 30.0 relative to 100 parts by weight of the support (Z).

Furthermore, the present invention provides a preparation method for a synthesis gas from a gas including carbon dioxide using a monolith catalyst.

Advantageous Effects

The monolith catalyst for a carbon dioxide reforming reaction according to the present invention may maintain relatively high activity for a long time when compared to a common granule type catalyst in performing a reforming reaction, and a synthesis gas may be prepared stably for a long time. In addition, pressure drop is relatively small due to the structural characteristic of a monolith, and process compatibilization may be of help.

MODE FOR IMPREGNATING OUT THE INVENTION

The present invention will be explained in more detail as follows.

The present invention provides a monolith catalyst for a carbon dioxide reforming reaction including a support impregnating an active material represented by the following Formula 1 and a monolith substrate.

$$a(X)-b(Zr)/Z \qquad \text{[Formula 1]}$$

In the above Formula 1, X is an active material of Co or Ni, Z is a support of $SiO_2$ or $Al_2O_3$, a and b each represents parts per weight of X and Zr relative to component Z in order, and a is 5.0 to 30.0, and b is 1.0 to 30.0 relative to 100 parts by weight of the support (Z).

The present invention provides a monolith catalyst for a carbon dioxide reforming reaction, including one component selected from cobalt (Co) or nickel (Ni), an active metal catalyst including zirconium (Zr) and a support component selected from silica ($SiO_2$) or alumina ($Al_2O_3$), where the amount of the active metal catalyst is optimized to satisfy Formula 1, and each metal precursor solution is carried in the support component selected from silica ($SiO_2$) or alumina ($Al_2O_3$), and further including a monolith substrate.

In the monolith catalyst of the present invention, the monolith catalyst support is provided for easy contact between a solid catalyst and a reaction gas to increase the surface area of the catalyst by impregnating the catalyst in a densely dispersed state. The monolith catalyst support may have, for example, a honeycomb structure, or a structure in which empty spaces with a rod shape are connected.

The amount of cobalt or nickel (a) is 5 to 30 parts by weight relative to 100 parts by weight of the support (Z), and preferably, in a range of 5 to 20 parts by weight. In the case that the amount of the active component is less than 5 parts by weight, the conversion of the reaction material may be slow, and in the case that the amount is greater than 30 parts by weight, the life of the catalyst may decrease due to the rapid generation of carbon deposition phenomenon and deactivation of the catalyst.

The amount of zirconium (b) is 1 to 30 parts by weight relative to 100 parts by weight of the support (Z), and preferably, in a range of 1 to 20 parts by weight. In the case that the amount of Zr is less than 1 part by weight, activation synergy effect may not be obtained, and in the case that the amount is greater than 30 parts by weight, the activity of the catalyst may be rather deteriorated.

The preferable shape of the monolith substrate according to the present invention is a honeycomb structure.

It is generally known that other transition metals such as cobalt and nickel are used as active components for producing a catalyst used for a methane and carbon dioxide reforming reaction, and alumina, silica, etc. are used as support components. Further studies on each ratio of the catalyst components are being actively conducted. Although a catalyst has excellent activity, a catalyst molding process is essential for the application to a practical process. However, a commonly used catalyst with a granule type has serious limitations concerning durability and stability due to rapid formation of cokes. In addition, the limitation of hard application to a system with a high flow rate is present due to large pressure drop. To solve the limitations, a monolith substrate with a honeycomb structure may be used. In a monolith catalyst in which empty spaces with a rod shape and a honeycomb structure are connected, heat may be easily transferred via walls, the temperature of the catalyst may become uniform, and the pressure drop may be small, thereby being provided as an appropriate shape for treating reactants with a high flow rate.

In addition, the monolith catalyst has high surface area per unit volume because of the dense structure, and excellent abrasion-resistance. In the case that the monolith catalyst is applied to a carbon dioxide reforming reaction, low carbon deposition due to rapid mass transfer, reinforcement of catalyst durability due to high thermal stability, and process compatibilization due to the possibility of a high flow rate reaction, may be realized.

A monolith catalyst is necessary for the conversion of a large amount of carbon dioxide in a short time because a reaction system with a high flow rate is required. In this case, the shape of the honeycomb structure may improve the strength of the support and may increase the catalyst activity due to high specific surface area.

According to the present invention, there is provided a preparation method of a monolith catalyst for a carbon dioxide reforming reaction including a support impregnating an active material represented by the following Formula 1 and a monolith substrate, including the steps of:

mixing and impregnating a metal precursor solution and a support Z of the following Formula 1 so as to meet the component ratio of the following Formula 1 (step 1);

coating the monolith substrate with the mixed and impregnated solution in step 1 (step 2);

drying the monolith substrate coated with the mixed and impregnated solution in step 2 (step 3); and calcining the dried monolith substrate after being coated with the mixed and impregnated solution in step 3 (step 4).

$$a(X)-b(Zr)/Z \qquad \text{[Formula 1]}$$

In Formula 1, X is an active material of Co or Ni, Z is a support of $SiO_2$ or $Al_2O_3$, a and b each represents parts per weight of X and Zr relative to component Z in order, and a is 5.0 to 30.0, and b is 1.0 to 30.0 relative to 100 parts by weight of the support (Z).

Hereinafter, the present invention will be explained step by step in detail.

Step 1 according to the present invention is a step of mixing and impregnating a metal precursor solution with the support Z of Formula 1 so as to meet the component ratio in Formula 1 and is a step of providing an active metal catalyst including a component selected from cobalt (Co) or nickel (Ni), zirconium (Zr), and a support component selected from silica ($SiO_2$) or alumina ($Al_2O_3$), where the content of the active metal catalyst is optimized to meet Formula 1, and each metal precursor solution is carried in and mixed with the support component selected from silica ($SiO_2$) or alumina ($Al_2O_3$).

$$a(X)-b(Zr)/Z \qquad \text{[Formula 1]}$$

In Formula 1, X is Co or Ni, Z (support) is a support of $SiO_2$ or $Al_2O_3$ coated with an active material, a and b each represents parts per weight of X and Zr relative to component Z in order, and a is 5.0 to 30.0, and b is 1.0 to 30.0 relative to 100 parts by weight of the support (Z).

Methods for impregnating and adding a catalyst in a support selected from silica or alumina using zirconium, cobalt or nickel element for optimizing Formula 1 are not specifically limited. As the impregnating methods, various impregnating methods such as a heating impregnation method, an ambient impregnation method, a vacuum impregnation method, a normal pressure impregnation method, an evaporation to dryness method, a pore peeling method, and an incipient wetness method, an immersion method, a spray method or an ion exchange method may be applied.

In addition, the precursor of each element in step 1 may be the following materials.

As a cobalt precursor, a cobalt compound such as $Co(NO_3)_2$ may be used, as a nickel precursor, a nickel compound such as $Ni(NO_3)_2$ may be used, and as a zirconium precursor, a zirconium compound such as $ZrCl_2O$ may be used.

The amount of cobalt or nickel (a) is 5 to 30 parts by weight relative to 100 parts by weight of the support (Z), and preferably in the range of 5 to 20 parts by weight. In the case that the amount of the active component is less than 5 parts by weight, conversion may be slow, and in the case that the amount is greater than 30 parts by weight, deactivation may occur due to the rapid carbon deposition of the catalyst, and the life of the catalyst may decrease.

The amount of zirconium (b) is 1 to 30 parts by weight relative to 100 parts by weight of the support (Z), and preferably, in the range of 1 to 20 parts by weight. In the case that the amount of Zr is less than 1 part by weight, activation synergy effect may not be obtained, and in the case that the amount is greater than 30 parts by weight, the activity of the catalyst may be rather deteriorated.

The preferable shape of the monolith substrate according to the present invention is a honeycomb structure.

It is generally known that other transition metals such as cobalt and nickel are used as the active components for producing a catalyst used for a carbon dioxide reforming reaction, and alumina, silica, etc. are used as the support component. Further studies on each ratio of the catalyst components are being actively conducted. Although a catalyst has excellent activity, a catalyst molding process is essential for the application to a practical process. However, a commonly used catalyst with a granule type has serious limitations concerning durability and stability due to rapid formation of cokes. In addition, the limitation of hard application to a system with a high flow rate due to large pressure drop is present. To solve the limitations, a monolith substrate with a honeycomb structure may be used. In a monolith catalyst in which empty spaces with a rod shape and a honeycomb structure are connected, heat may be easily transferred via walls, the temperature of the catalyst may become uniform, and the pressure drop may be small, thereby being provided as an appropriate shape for treating reactants with a high flow rate. In addition, the monolith catalyst has high surface area per unit volume because of the dense structure and excellent abrasion-resistance. In the case that the monolith catalyst is applied to a carbon dioxide reforming reaction, low carbon deposition due to rapid mass transfer, reinforcement of catalyst durability due to high thermal stability, and process compatibilization due to the possibility of a high flow rate reaction, may be realized.

A monolith catalyst is necessary for the conversion of a large amount of carbon dioxide in a short time because a reaction system with a high flow rate is required. In this case, the shape of the honeycomb structure may improve the strength of the support and may increase the catalyst activity due to high specific surface area.

Step 2 according to the present invention is a step of coating the monolith substrate with the support carried in step 1 and is a step of impregnating and coating the monolith substrate with the mixed and impregnated solution in step 1.

Step 3 according to the present invention is a step of drying the monolith substrate coated with the precursor solution in step 1, and is a step of drying the coated support in an oven at 110° C. for about 1 hour.

Step 4 according to the present invention is a step of calcining the dried monolith substrate after being coated with the precursor solution at step 2, and the calcining may preferably be performed at 150 to 700° C. for 5 to 48 hours.

In the case that the calcining temperature is less than 150° C., the physical properties of the catalyst may not be changed, and a dried state may be obtained, thereby not forming the chemical bond of the catalyst (bond between the catalyst components or between the catalyst component and the support). In the case that the temperature is greater than 700° C., the oxidation degree of the catalyst may be high, and the chemical bonds of some catalyst components may be broken, bonding with the catalyst activation components may not be maintained but may be separated therefrom at about 700° C. Thus, the above-mentioned range may be preferable.

In this case, the preparation method is preferably performed by repeating from step 1 to step 3 so that the weight ratio of the support impregnating the active material and the monolith substrate may be greater than 0.8 to less than 1.2:1.

In the case that the weight ratio is less than or equal to 0.8, the ratio of the catalyst activation components relative to the support is low, and the reaction may not be carried out smoothly, and in the case that the weight ratio is greater than or equal to 1.2, multiple layers of coating of the catalyst may be formed, and the catalyst components not participating in the reaction may increase. Thus, the catalyst component is not efficient, and the activity of the catalyst components may be deteriorated due to calcining phenomenon.

In the case of using the monolith catalyst prepared by the above method in a production process for a synthesis gas including carbon monoxide and hydrogen, the activity of the catalyst may be maintained for a long time and the pressure drop may decrease when compared to a common granule type molded catalyst.

Further, a preparation method for a synthesis gas from a gas including carbon dioxide using the monolith catalyst prepared by the above preparation method will be provided.

Reactors for the reforming reaction of methane and carbon dioxide are not specifically limited to commonly used ones in the art, and particularly, a gas phase fixed bed reactor, a fluidized bed reactor, a liquid phase slurry bed reactor, etc., may be used.

As preferable reaction conditions, the reaction temperature of 650° C. to 850° C., the pressure of 0.01 to 0.1 MPa, and the space velocity of 5,000 to 50,000 ml/gcat·hr may be applied.

In the case that the reaction temperature is less than 650° C., the reaction rate may be insufficient, and the conversion of reactants may not be sufficiently performed, and in the case that the reaction temperature is greater than 850° C., the carbonization of the catalyst may be initiated, thereby inducing early deactivation.

In the case that the reaction pressure increases, the activity of the catalyst may be maintained stably, however the reaction pressure is not a considerably affecting variable. In the case that the pressure is greater than 0.1 MPa, the initial installation cost of the reactor may be large.

In the case that the space velocity is less than 5,000 ml/gcat·hr, productivity may be too low, and in the case that the space velocity is greater than 50,000 ml/gcat·hr, contact hour of the reactants with the catalyst may decrease, thereby deteriorating the efficiency of a reforming reaction.

The catalyst produced according to the present invention may be efficiently applied to the reforming reaction of methane and carbon dioxide, because the active metal is uniformly dispersed on the surface of the support through separately coating each active metal and calcining the catalyst. In addition, when compared to the activity of a reforming reaction of methane and carbon dioxide with a common granule type catalyst, high conversion ratio and stability may be obtained, pressure drop may decrease, and a reaction with a high flow rate may be conducted according to the present invention.

Hereinafter, the present invention will be explained referring to exemplary embodiments, however the present invention is not limited to the following embodiments. The monolith catalyst prepared by the present invention may be applied to an oxygen-carbon dioxide-vapor tri-reforming reaction of methane, and a carbon dioxide reforming reaction using ethane, propane, etc. instead of methane, as well as a dry reforming reaction of methane and carbon dioxide.

EXAMPLES 1 TO 4

Preparation of Catalysts I to IV $Co(NO_3)_2 \cdot H_2O$ or $Ni(NO_3)_2 \cdot H_2O$ and $ZrCl_2O \cdot H_2O$ were dissolved in distilled water in a ratio shown in Table 1

(Examples 1 and 2: $Co(NO_3)_2 \cdot H_2O$, Examples 3 and 4: $Ni(NO_3)_2 \cdot H_2O$), followed by mixing with a silica ($SiO_2$) or $Al_2O_3$ support (Examples 1 and 3: silica ($SiO_2$), Examples 2 and 4: $Al_2O_3$). A monolith substrate was coated with the solution thus obtained in a weight ratio shown in Table 1, followed by drying in an oven at about 110° C. for 1 hour. The coating and drying were repeated many times to prepare a monolith catalyst so that the weight ratio of the monolith substrate and catalyst components became about 1:1. The monolith catalyst with the monolith substrate coated with the catalyst components was calcined at 400° C. for 6 hours to produce a monolith catalyst according to the present invention.

COMPARATIVE EXAMPLES 1 TO 4

Preparation of Catalysts I to IV $Co(NO_3)_2 \cdot H_2O$ or $Ni(NO_3)_2 \cdot H_2O$ and $ZrCl_2O \cdot H_2O$ were dissolved in distilled water in a ratio shown in Table 1 (Comparative Examples 1 and 2: $Co(NO_3)_2 \cdot H_2O$, Comparative Examples 3 and 4: $Ni(NO_3)_2 \cdot H_2O$), followed by mixing with a silica ($SiO_2$) or $Al_2O_3$ support (Comparative Examples 1 and 3: silica ($SiO_2$), Comparative Examples 2 and 4: $Al_2O_3$). The solution thus mixed was completely dried, followed by pulverizing to less than or equal to 80 mesh and mixing 15 wt % of microcrystalline cellulose and 85 wt % of a catalyst for molding. The mixture was mixed with colloidal silica as a binder (20 wt % relative to the solution), and a catalyst was prepared via a molder. The catalyst thus prepared was classified by size and was calcined at 400° C. for 6 hours to prepare a granule type molded catalyst.

COMPARATIVE EXAMPLES 5 AND 6

Preparation of Catalysts I to IV $Ni(NO_3)_2 \cdot H_2O$ was dissolved in distilled water in a ratio shown in Table 1 and mixed with a silica ($SiO_2$) support. A monolith substrate was coated with the solution thus obtained in a weight ratio shown in Table 1, followed by drying in an oven at about 110° C. for 1 hour.

The coating and drying were repeated many times to prepare a monolith catalyst so that the weight ratio of the monolith substrate and catalyst components became about 0.8:1 (Comparative Example 1) and 1.2:1 (Comparative Example 2). The monolith catalyst with the monolith substrate coated with the catalyst components was calcined at 400° C. for 6 hours to produce a monolith catalyst.

EXPERIMENTAL EXAMPLE 1

Evaluation of Catalyst Performance I

A reforming reaction of methane and carbon dioxide was performed according to the following method for comparing the performance of the catalysts prepared in Examples 1 to 4 and Comparative Examples 1 to 6, and the results are shown in Table 1. 1.0 g of each of the catalysts prepared in Examples 1 to 4 and Comparative Examples 1 to 6 was filled in a reactor, where catalysts having a size of 16 to 30 meshes were used in Comparative Examples 1 to 4. In this case, the weight of the catalyst was the weight of pure active catalysts represented by Formula 1 excluding monolith, binder, etc.

As the reactor, a fixed bed tubular reactor equipped with an external heating system, having an inner diameter of 2 cm and being formed using a quartz material, was used. A mixture gas of methane/carbon dioxide in a molar ratio of 1:1 was supplied into the reactor in a space velocity of 20,000 ml/gcat·hr to perform a catalyst reaction. In this case, the catalyst reaction was performed under an atmospheric atmosphere at the reaction temperature of 850° C., and exhausted gas after reaction was analyzed using a thermal conductivity detector of an online gas chromatography system.

As shown in the following Table 1, the conversion ratio of $CO_2$ was 84 to 98%, and the conversion ratio of $CH_4$ was 72 to 94% when using the monolith catalysts prepared in Examples 1 to 4 according to the present invention. On the contrary, in the case of using the monolith or granule type catalysts according to Comparative Examples 1 to 6, the conversion ratio was decreased.

EXPERIMENTAL EXAMPLE 2

Evaluation of Catalyst Performance II

Figure 1:
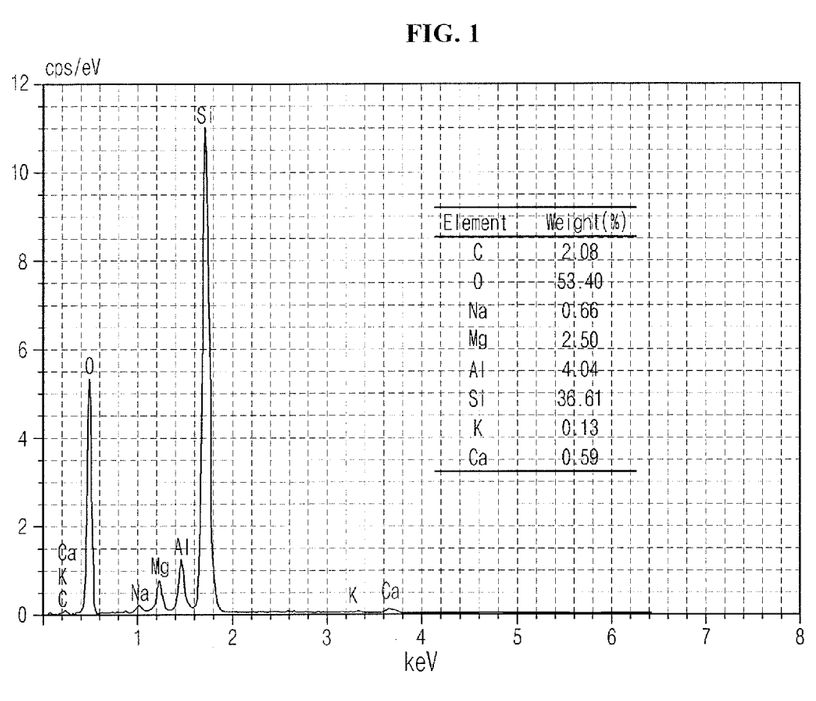
FIG. 1 is a graph for showing EDS analysis of a monolith substrate.
Figure 2:
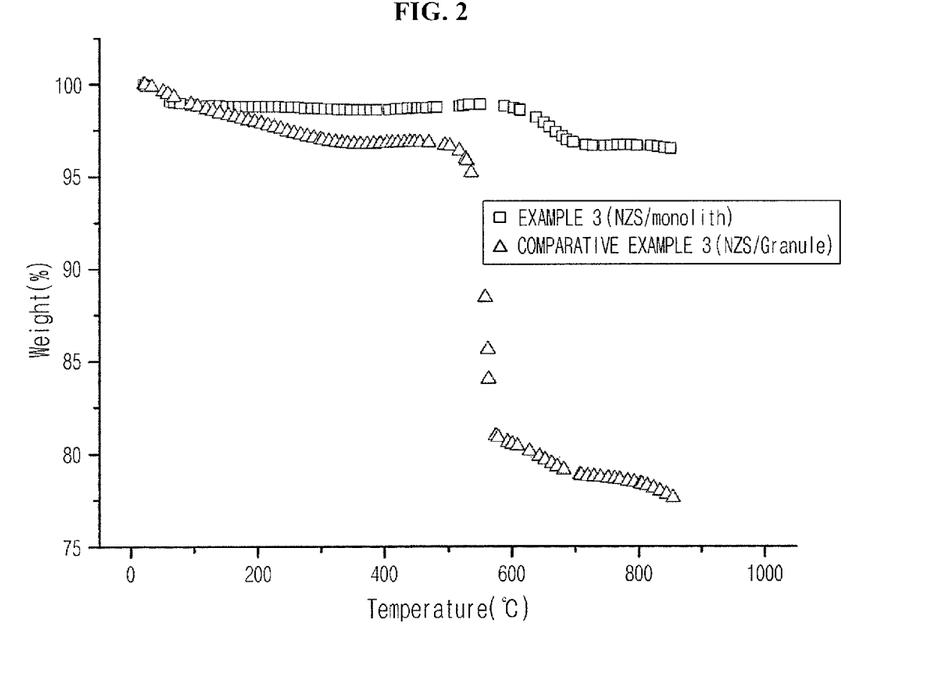
FIG. 2 illustrates graphs on TGA analyses with respect to catalysts after performing reaction according to Example 3 and Comparative Example 3.

Thermo gravimetric analyses and differential thermal analyses (TGA-DTA) were conducted to compare carbon deposition after the reactions of monolith (Example 3) and granule (Comparative Example 3) catalysts. Weight loss of each of the catalysts prepared in Example 3 and Comparative Example 3 with respect to the temperature was observed to 800° C. in a temperature elevation rate of 10° C./min using 2960 SDT V3.0F (TA Instruments, USA) under an air atmosphere. The results are shown in FIG. 2. In FIG. 2, rapid weight loss was found in a range between 500 and 700° C. in the granule catalyst when compared to the monolith catalyst, and it was found that the formation of carbon deposition was high in the granule catalyst.

EXPERIMENTAL EXAMPLE 3

Evaluation of Catalyst Performance III

Figure 3:
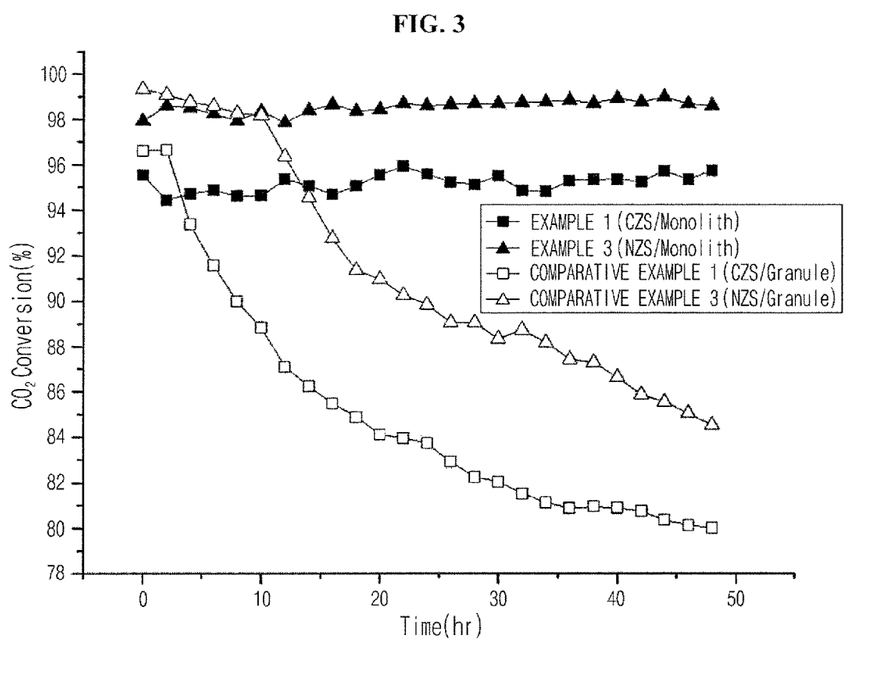
FIG. 3 illustrates graphs on carbon dioxide conversion ratio with respect to time as the results according to Examples 1 and 3 and Comparative Examples 1 and 3.

In order to compare the catalyst performance of the monolith catalyst and the granule catalyst, a reaction was performed under experimental conditions and methods explained in Experimental Example 1, and the conversion ratio of carbon dioxide with respect to time was calculated on the basis of the gas chromatography analysis data of the reactants for each of the catalysts prepared in Examples 1 and 3 and Comparative Examples 1 and 3, and the results are shown in FIG. 3. As shown in FIG. 3, when comparing the carbon dioxide conversion ratio at initial time and after about 40 hours of the reaction, the carbon dioxide conversion ratio in Examples 1 and 3 using the monolith catalyst was not much changed with respect to time, however the carbon dioxide conversion ratio in Comparative Examples 1 and 3 using the granule catalyst was rapidly decreased. The rapid decrease of the conversion ratio may be explained by the rapid formation of cokes in the granule type catalyst, and this phenomenon was common in both cobalt-based and nickel-based catalysts.

From the results, the monolith catalyst including the components of Formula 1 showed high activity with the carbon dioxide conversion ratio of about 98% in the reforming reaction of methane and carbon dioxide and high stability with less carbon deposition when compared to the granule type molded catalyst.

TABLE 1

| Division | Components and ratios | | | | Catalyst type | Catalyst component:Monolith substrate (weight ratio) | $CH_4$ conversion ratio (%) | $CO_2$ conversion ratio (%) |
|---|---|---|---|---|---|---|---|---|
| | X Components | Amount a | Zr Amount b | Support Z | | | | |
| Example 1 | Co | 9 | 10 | $SiO_2$ | Monolith | 1:1 | 93 | 96 |
| Example 2 | Co | 9 | 10 | $Al_2O_3$ | Monolith | 1:1 | 72 | 84 |
| Example 3 | Ni | 9 | 10 | $SiO_2$ | Monolith | 1:1 | 94 | 98 |
| Example 4 | Ni | 9 | 10 | $Al_2O_3$ | Monolith | 1:1 | 75 | 90 |
| Comparative Example 1 | Co | 9 | 10 | $SiO_2$ | Granule | — | 72 | 80 |
| Comparative Example 2 | Co | 9 | 10 | $Al_2O_3$ | Granule | — | 30 | 43 |
| Comparative Example 3 | Ni | 9 | 10 | $SiO_2$ | Granule | — | 77 | 84 |
| Comparative Example 4 | Ni | 9 | 10 | $Al_2O_3$ | Granule | — | 47 | 60 |
| Comparative Example 5 | Ni | 9 | 10 | $SiO_2$ | Monolith | 0.8:1 | 80 | 88 |
| Comparative Example 6 | Ni | 9 | 10 | $SiO_2$ | Monolith | 1.2:1 | 85 | 91 |

In a(X) – b(Zr)/Z, a and b represent parts by weight of active metal X and Zr relative to 100 parts by weight of a support Z.

The invention claimed is:

1. A monolith catalyst for a carbon dioxide reforming reaction comprising a support impregnating an active material represented by the following Formula 1 and a monolith substrate, wherein a weight ratio of the support impregnating the active material and the monolith substrate is 1:1:

$$a(X)-b(Zr)/Z \quad \text{[Formula 1]}$$

where X is an active material of Ni, Z is a support of $SiO_2$, a and b each represents parts per weight of X and Zr relative to component Z in order, and a is 5.0 to 30.0, and b is 1.0 to 30.0 relative to 100 parts by weight of the support (Z).

2. The monolith catalyst for a carbon dioxide reforming reaction as set forth in claim 1, wherein the shape of the monolith substrate is a honeycomb structure.

* * * * *